(12) United States Patent
Fukuya et al.

(10) Patent No.: US 11,756,248 B2
(45) Date of Patent: Sep. 12, 2023

(54) COMPUTER GRAPHICS OBJECT RENDERING BASED ON PRIORITY

(71) Applicant: International Business Machines Corporation, Armonk, NY (US)

(72) Inventors: Kiichi Fukuya, Soka (JP); Yansen Xu, Tokyo (JP); Michiko Tazawa, Kawasaki (JP); Taiga Mizuide, Ageo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/409,001

(22) Filed: Aug. 23, 2021

(65) Prior Publication Data
US 2023/0065943 A1 Mar. 2, 2023

(51) Int. Cl.
G06T 11/60 (2006.01)

(52) U.S. Cl.
CPC .......... *G06T 11/60* (2013.01); *G06T 2200/16* (2013.01)

(58) Field of Classification Search
CPC .............................. G06T 11/60; G06T 2200/16
See application file for complete search history.

(56) References Cited

U.S. PATENT DOCUMENTS

| | | | |
|---|---|---|---|
| 6,329,986 B1 * | 12/2001 | Cheng | G06F 3/011 715/706 |
| 8,126,985 B1 | 2/2012 | Kandekar et al. | |
| 8,516,396 B2 | 8/2013 | Bromenshenkel et al. | |
| 9,498,727 B2 | 11/2016 | Bolger et al. | |
| 10,636,217 B2 | 4/2020 | Osman | |
| 2010/0023406 A1 * | 1/2010 | Bhogal | G06Q 30/0601 705/26.1 |
| 2010/0134485 A1 * | 6/2010 | Bhogal | A63F 13/52 715/706 |
| 2010/0306652 A1 * | 12/2010 | Bolger | H04L 67/131 715/706 |
| 2014/0176567 A1 * | 6/2014 | Bolger | G06T 13/00 345/473 |
| 2014/0361977 A1 * | 12/2014 | Stafford | G06F 3/013 345/156 |

(Continued)

OTHER PUBLICATIONS

H. Rahimi, A. A. N. Shirehjini and S. Shirmohammadi, "Context-aware prioritized game streaming," 2011 IEEE International Conference on Multimedia and Expo, 2011, pp. 1-6 (Year: 2011).*

(Continued)

*Primary Examiner* — Terrell M Robinson
(74) *Attorney, Agent, or Firm* — James L. Olsen

(57) ABSTRACT

Aspects of the present disclosure relate to determining computer graphics objects (CGOs) to render for a device of a user in a virtual environment having a plurality of participants, each participant corresponding to a CGO. A priority value of each CGO corresponding to each participant can be determined. A CGO priority list can be generated based on the determined priority values, wherein the CGO priority list ranks the CGOs based on the priority values. A rendering list of CGOs can be generated, wherein the rendering list includes a subset of the CGOs of the CGO priority list based on applied rendering processing constraints. The CGOs of the rendering list can then be rendered.

15 Claims, 11 Drawing Sheets

(56) References Cited

U.S. PATENT DOCUMENTS

2016/0164769 A1* 6/2016 Haggar .............. G06F 3/04815
709/224
2023/0017111 A1* 1/2023 Ch ......................... H04S 3/008

OTHER PUBLICATIONS

Unknown, "Avatar Performance Ranking System", VRChat, printed Jul. 14, 2021, 9 pages <https://docs.vrchat.com/docs/avatar-performance-ranking-system>.

Kobayashi, K., "About drawing optimization in Unity", Frame Synthesis, Last updated: Nov. 18, 2018, printed Jul. 14, 2021, English Translation, 2 pages, <https://framesynthesis.jp/tech/unity/performance/>.

Unknown, "Oculus Rift: Adaptive Pixel Density", printed Jul. 14, 2021, 4 pages.

Mell et al., "The NIST Definition of Cloud Computing", Recommendations of the National Institute of Standards and Technology, Sep. 2011, 7 pages.

\* cited by examiner

| Priority Change Factors | Type | Example Priority Variation |
|---|---|---|
| Role of Participant (e.g., lecturer, host, presenter) | Attribute | +500, ∞ (top priority) |
| Defined Special Value (e.g., protocol offender) | Attribute | -500, -∞ (lowest priority) |
| High Degree of Profile Matching | Attribute | +30 |
| Low Degree of Profile Matching | Attribute | -30 |
| Add/Remove Friend | Action | +50 / -50 |
| Start/End Speaking | Action | +40 / -10 |
| Greeting | Action | +10 |
| Conversation Quality (negative, neutral, positive) | Action | -5 / +5 / +20 |
| Conversation Quantity (duration: X seconds) | Action | +1x |

COMPUTER GRAPHICS OBJECT RENDERING BASED ON PRIORITY

BACKGROUND

The present disclosure relates generally to the field of computing, and in particular, to rendering computer graphics objects.

Within virtual environments (e.g., video games), a plurality of computer graphics objects may be rendered within the environment. Computer graphics objects rendered with the environment may correspond to environmental objects, non-playable characters (e.g., artificially intelligent agents), and/or characters associated with (e.g., controlled by) a human. These environments can be displayed to users via virtual displays (e.g., head-mounted displays (HMDs)) and/or monitors.

SUMMARY

Aspects of the present disclosure relate to a method, system, and computer program product for determining computer graphics objects (CGOs) to render for a device of a user in a virtual environment having a plurality of participants, each participant corresponding to a CGO. A priority value of each CGO corresponding to each participant can be determined. A CGO priority list can be generated based on the determined priority values, wherein the CGO priority list ranks the CGOs based on the priority values. A rendering list of CGOs can be generated, wherein the rendering list includes a subset of the CGOs of the CGO priority list based on applied rendering processing constraints. The CGOs of the rendering list can then be rendered.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 is a diagram depicting priority change factors mapping to priority value variations, in accordance with embodiments of the present disclosure.

Figure 1:
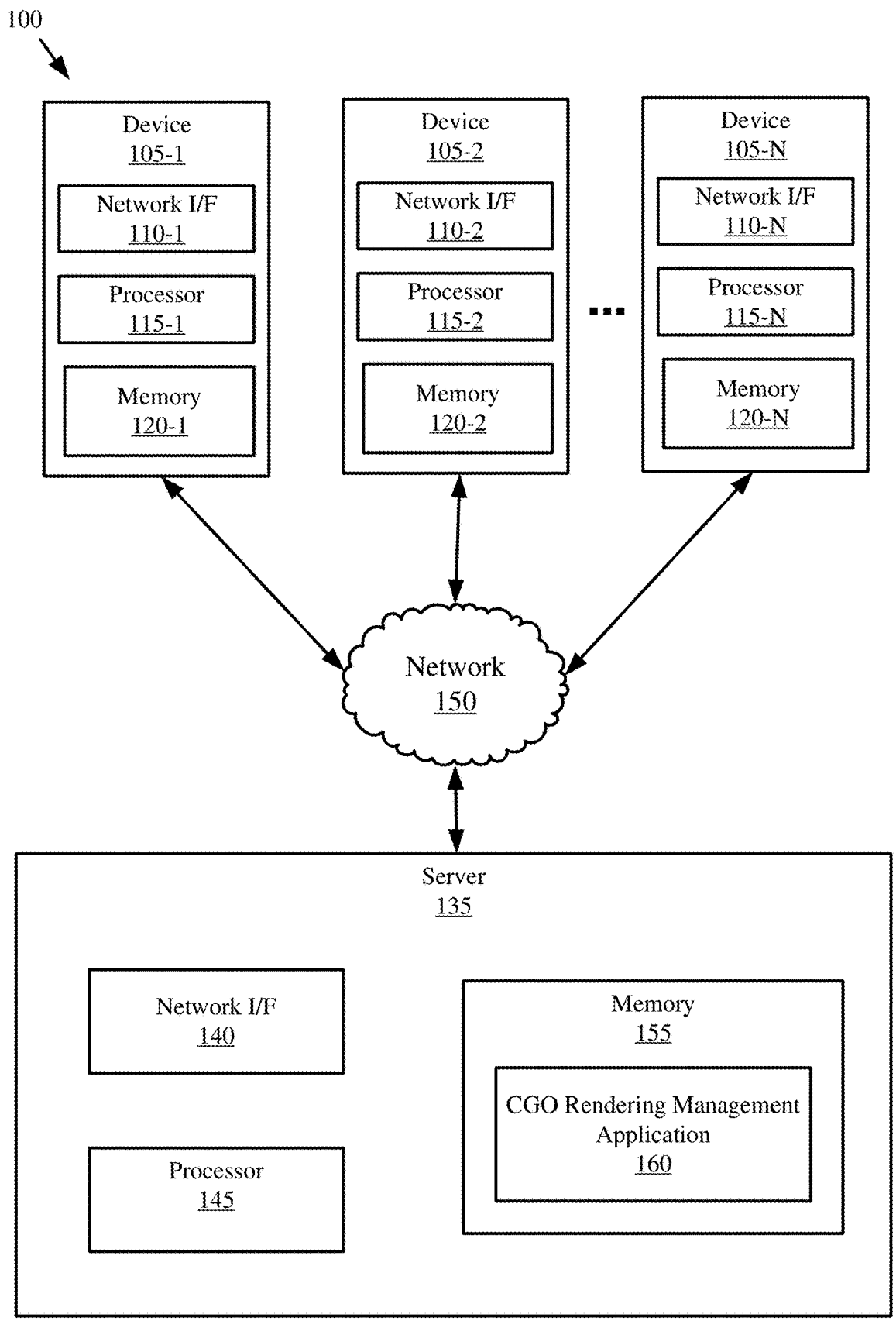
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to rendering computer graphics objects. While the present disclosure is not necessarily limited to such applications, various aspects of the disclosure may be appreciated through a discussion of various examples using this context.

Within virtual environments (e.g., video games), a plurality of computer graphics objects may be rendered within the environment. Computer graphics objects rendered with the environment may correspond to environmental objects, scenery, non-playable characters (e.g., artificially intelligent agents), and/or characters associated with (e.g., controlled by) a human. These environments can be displayed to users via virtual displays (e.g., head-mounted displays (HMDs)) and/or monitors.

As the number and detail of computer graphics objects (CGOs) within virtual environments increases, the rendering processing load required for computing resources also increases. For example, if a large number of detailed objects are required to be displayed for a user within the environment, a computing device associated with the user may be unable to successfully render the objects within the environment (e.g., with sufficient speed to meet user quality expectations, such as frame rate). This can lead to the user being required to significantly reduce graphics settings (e.g., resolution) to avoid failure (e.g., crashes, freezing, lag, or other errors). There is a need to improve CGO rendering such that user devices can render virtual environments without necessarily having to reduce settings and/or without experiencing failures.

Aspects of the present disclosure relate to determining computer graphics objects (CGOs) to render for a device of a user in a virtual environment having a plurality of participants, each participant corresponding to a CGO. A priority value of each CGO corresponding to each participant can be determined. A CGO priority list can be generated based on the determined priority values, wherein the CGO priority list ranks the CGOs based on the priority values. A rendering list of CGOs can be generated, wherein the rendering list includes a subset of the CGOs of the CGO priority list based on applied rendering processing constraints. The CGOs of the rendering list can then be rendered.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a computer graphics object (CGO) rendering management application 160. The CGO rendering management application 160 can be configured to manage CGOs to be rendered for a particular user within a multi-user virtual environment (e.g., a virtual reality chat room). In embodiments, each CGO (e.g., player avatar or character) which is considered to be rendered can be specifically associated with (e.g., controlled by) a particular other user (e.g., participant) within the multi-user virtual environment. By selectively determining which CGOs associated with other users should be rendered, a processing load associated with the rendering can be reduced (e.g., below a maximum processing capacity of a device associated with the user, such as device 105-1).

The CGO rendering management application 160 can be configured to determine the priority (e.g., a priority value) of CGOs within the virtual environment. As referenced herein, a "CGO priority" refers to a relative importance of a given CGO to be rendered with respect to other CGOs within the environment for a given user. In embodiments, the priority of CGOs can be set to an initial value (e.g., an integer value, such as 100), and thereafter, the CGO priority values can be dynamically updated over time. The CGO rendering management application 160 can be configured to update the priority of CGOs (e.g., CGO priority values) based on one or more priority change factors. Priority change factors can include attributes of users (e.g., user roles) and/or actions completed by users within the virtual environment (e.g., detected speech). A mapping of priority change factors to priority value variations can be referenced to determine the magnitude of priority changes for each user over time. An example priority change factor to priority variation mapping is depicted in FIG. 4.

Thereafter, upon determining CGO priorities of one or more CGOs within the virtual environment, a list of CGOs within the multi-user virtual environment can be ranked according to the determined priority values (e.g., in descending order). Thereafter, the ranked list of CGOs based on priority ("CGO priority list") can be referenced when determining which CGOs to render.

The CGO rendering management application 160 can then be configured to render one or more CGOs on the CGO priority list based on rendering processing constraints. Rendering processing constraints refer to rules on the number of CGOs of the CGO priority list to render. Rendering processing constraints can further refer to rules for the degree of rendering (e.g., resolution, graphical detail, etc.) of CGOs based on priority. For example, a rendering processing constraint can specify that only CGOs above a threshold priority value should be rendered, that CGOs falling within a given range of priority values should be rendered with low resolution, that CGOs falling below a threshold should not be rendered, etc. However, any suitable rendering processing constraints can be implemented. In some embodiments, the number of CGOs to render can depend on an available processing capacity of a device configured to render the CGOs. In some embodiments, CGOs falling below a threshold priority value can be randomly selected for rendering based upon an available capacity of a device configured to render the CGOs. In some embodiments, one or more graphical features of CGOs may not be rendered based on the priority value of such CGOs. For example, a first CGO having a relatively low priority value may only be rendered to include an upper half, head, or other portion of the total CGO.

Thereafter, the CGOs which are determined to be rendered (based on the rendering processing constraints applied to the CGO priority list) can be rendered. Further, the rendered CGOs can be rendered according to the rendering processing constraints (e.g., the resolution, graphical features, etc. of each rendered CGO may vary).

As discussed herein, "rendering" a CGO refers to performing one or more algorithms and/or techniques to render a 2D or 3D model associated with the CGO within a virtual environment (e.g., computer program). Rendering can rely on principles of light physics, geometric optics, visual perception, and mathematics. Rendering can be performed by any suitable component of a device, such as a central processing unit (CPU) or graphical processing unit (GPU). Rendering can include pre-rendering and/or real-time rendering. One or more 3D hardware accelerators can be used to improve real-time rendering performance. Features of a rendered CGO can include, but are not limited to, shading, texture mapping, bump mapping, fogging, shadows, reflections, transparency, translucency, refraction, diffraction, indirect illumination, caustics, depth of field, motion blur, and non-photorealistic rendering. Techniques for rendering can include, but are not limited to rasterization, ray casting, ray tracing, radiosity, and others. In embodiments, rendering can include sampling, filtering, and antialiasing.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, though the CGO rendering management application 160 is shown as located on the server 135, in some embodiments, the CGO rendering management application 160 can be stored and executed on devices 105. As an example, the functionalities of the CGO rendering management application 160 can be associated with (e.g., integrated within) a software application (e.g., a video game or virtual reality application) running on device 105-1.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
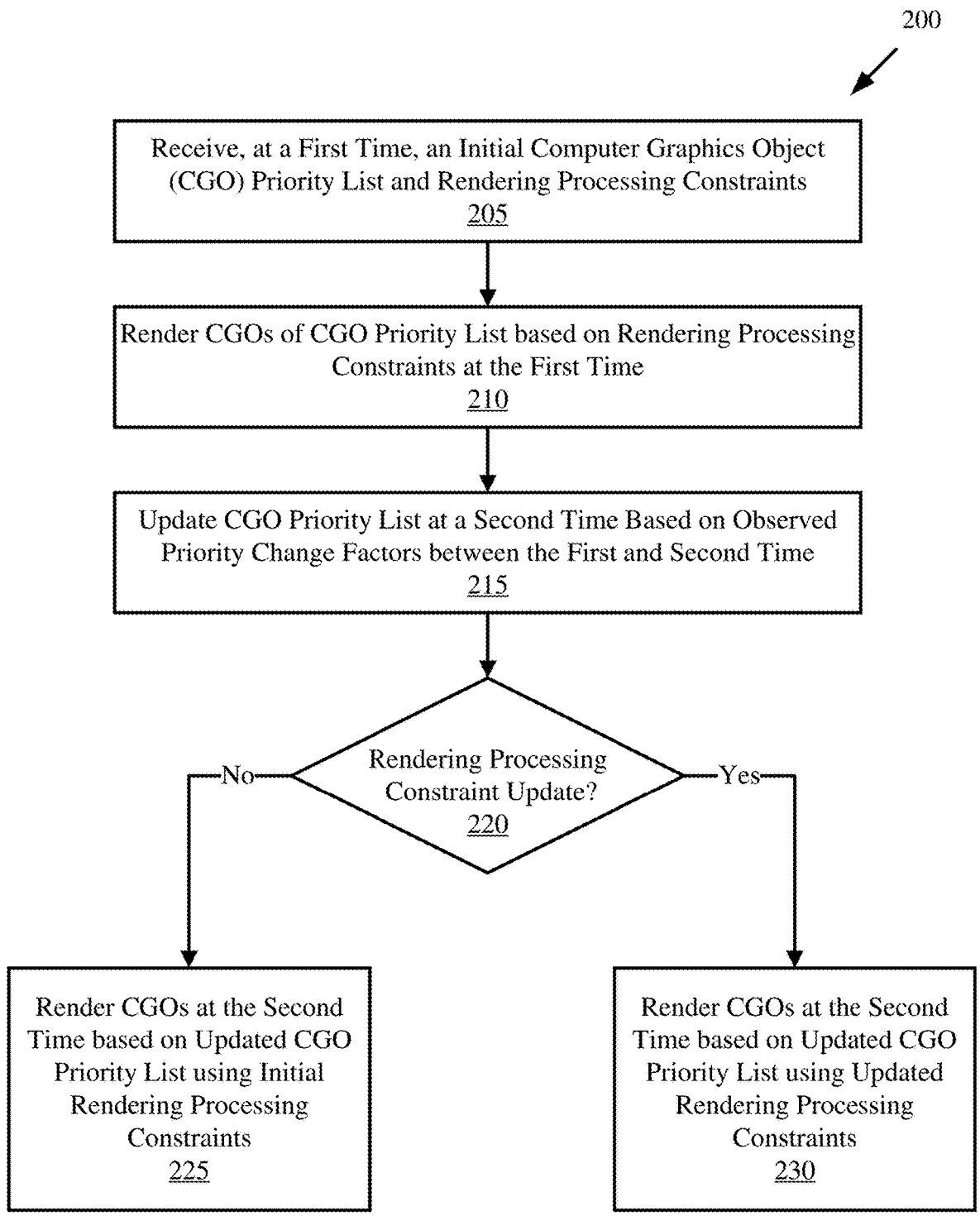
FIG. 2 is a flow-diagram illustrating an example method for rendering CGOs based on a CGO priority list and rendering processing constraints, in accordance with embodiments of the present disclosure.

Referring now to FIG. 2, shown is a flow diagram of an example method 200 for rendering CGOs within a multi-user virtual environment based on priority, in accordance with embodiments of the present disclosure. One or more operations of method 200 can be completed by one or more processing circuits (e.g., of devices 105 and server 135)

Method 200 initiates at operation 205, where at a first time, an initial computer graphics object (CGO) priority list and rendering processing constraints are received.

The initial CGO priority list can be ranked based on initial priority values assigned to each CGO within a multi-user virtual environment. For example, each CGO can be assigned a default priority value (e.g., 100). In some embodiments, each CGO can be initially ranked based on attributes associated with each CGO, such as a user role (e.g., lecturer, host, administrator, etc.), a defined special value (e.g., rule violator), a degree of matching to the user (e.g., high match, low match), a particular CGO model, etc. Each attribute can correspond to a priority value variation which may be applied to an initial priority value assigned to each CGO.

The rendering processing constraints can define the number of CGOs to be rendered from the CGO priority list based on one or more predefined rules (e.g., thresholds) and/or processing constraints associated with a device configured to perform the rendering. The rendering processing constraints can further define the degree of rendering (e.g., the resolution and other graphical features) of each CGO. The rendering processing constraints can be determined/defined in any suitable manner. For example, a user for which rendering is performed for can manually define the rendering processing constraints. In embodiments, the rendering processing constraints are dynamically updated based on available processing capacity of a device configured to perform the rendering.

The CGOs of the CGO priority list within the multi-user virtual environment are then rendered according to the rendering processing constraints. This is illustrated at operation 210. For example, if rendering processing constraints define that only CGOs which exceed a particular priority value (e.g., 50) are rendered, then only CGOs which exceed the priority value may be rendered. As another example, if rendering processing constraints define that CGOs having priority values within a given range (e.g., 25-50) will be rendered with low resolution, then any CGOs within priority value range may be rendered with low resolution. However, any suitable rendering processing constraints can be defined.

The CGO priority list is then updated at a second time based on observed priority change factors between the first and second time. This is illustrated at operation 215. That is, between the first and second time, priority change factors which map to priority value variations (e.g., see FIG. 4) can be monitored. Each observed priority change factor associated with each CGO within the multi-user virtual environment can be stored. Then, at the second time, each CGO priority value can be updated based on the stored priority variations (e.g., by adding and/or subtracting the variations from each CGO's initial priority). Thereafter, the CGO priority list can be reranked (e.g., in descending order) according to the new priority values assigned to each CGO.

A determination is then made whether there is a rendering processing constraint update at the second time. This is illustrated at operation 220.

If there is not a rendering processing constraint update, then the CGOs of the multi-user virtual environment can be rendered at the second time based on the updated CGO priority list using the initial rendering processing constraints (e.g., applied at operations 205-210). This is illustrated at operation 225. For example, the same priority thresholds, degree of rendering based on priority, and number of CGOs to render based on available processing capacity implemented at operations 205-210 can be applied at operation 225.

If there is a rendering processing constraint update, then the CGOs of the multi-user virtual environment can be rendered at the second time based on the updated CGO priority list using the updated rendering processing constraints. This is illustrated at operation 230. For example, updated rendering processing constraints can include one or more updated priority thresholds, updated degrees of rendering based on priority values, and updated number of CGOs to render based on available capacity can be implemented at operation 230.

The aforementioned operations can be completed in any order and are not limited to those described. Additionally, some, all, or none of the aforementioned operations can be completed, while still remaining within the spirit and scope of the present disclosure.

Figure 3:
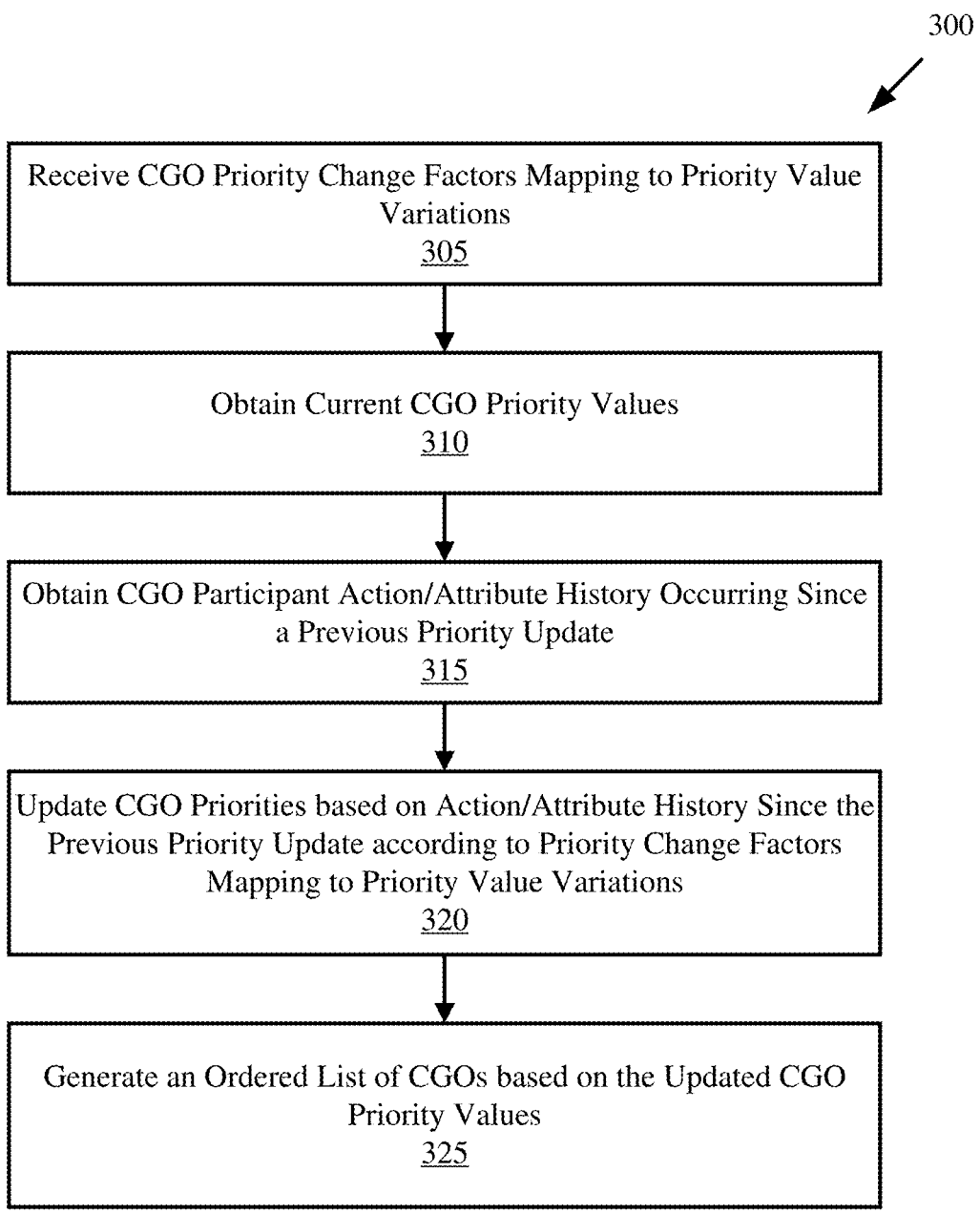
FIG. 3 is a flow-diagram illustrating an example method for updating CGO priority values of CGOs based on priority change factors, in accordance with embodiments of the present disclosure.

Referring now to FIG. 3, shown is a flow-diagram of an example method 300 for updating priority values of CGOs based on priority change factors, in accordance with embodiments of the present disclosure.

Method 300 initiates at operation 305, where CGO priority change factors are received. This is illustrated at operation 305. Priority change factors can be pre-determined factors which adjust priority values of respective CGOs. Each priority change factor may be mapped to a corresponding priority value variation. Examples of mappings of priority change factors to priority variations are depicted in FIG. 4.

As shown in table 400 of FIG. 4, priority change factors can include attributes and actions. Attributes include features of a CGO which may be relatively static compared to actions. However, in embodiments, attributes can change based on the specific virtual environment, based on additional interactions between the user and one or more participants, and/or based on actions taken by participants. As shown in FIG. 4, attributes include a role of the participant, a defined special value, a high degree of profile matching, and a low degree of profile matching. However, the attributes shown in FIG. 4 are merely exemplary, and any suitable attributes can be used to dictate priority value variations.

The role of the participant can be a user role assigned within the virtual environment. For example, in a virtual environment chat room where a given participant (e.g., a CGO of the participant) is giving a presentation, the role of the participant may be set to "presenter." In this instance, the presenter may be assigned high priority given they are the focus of the virtual environment. Thus, an example priority value variation for the role "presenter" can be +500 or maximum (e.g., the participant is automatically set to the highest priority user and thus is first the CGO priority list). This can ensure that a CGO corresponding to the presenter is rendered (e.g., with high detail). However, any suitable user roles can be implemented. In embodiments, user roles can also deduct from a participant's priority value. For example, a participant with the role "attendee" may lead to a priority value variation of −100.

The defined special value can be a circumstantial value set based on rules within a given virtual environment or platform. For example, assume the virtual environment is a comedy act in which a plurality of users are set to be spectators. If a spectator disrupts the comedy act, they may be assigned a defined special value indicating they are a protocol offender. Thus, the CGO of this spectator may be "muted" or "hidden" from the user. This can be achieved by applying a large priority value deduction (e.g., −500) and/or setting the user to the lowest priority. However, defined special values can be applied in any suitable manner. For example, in an instance where the virtual environment is a competition, and a given participant wins the competition, the defined special value may provide a large priority value bonus to the participant, thus prioritizing the CGO of the competition winner.

The degree of profile matching between the user and one or more participants can also be used to adjust priority values of CGOs of participants. A degree of matching between the user can be determined based on an analysis of stored data associated with each user. For example, social media data, user profile gaming data (e.g., indicating video games each user plays, and the corresponding duration or "playtime"), and other information can be analyzed (e.g., using machine learning models and/or natural language processing). Based on a comparison between the user and a participant, a degree of matching can be determined. A priority value variation can then be applied based on the degree of matching. As shown in FIG. 4, a high degree of matching between a user and another participant may lead to a positive priority variation (e.g., +30). A low degree of matching between the user and another participant may lead to a negative priority variation (e.g., −30).

Actions completed by each participant over a given time interval can be used to adjust priority values of participants. Example actions shown in FIG. 4 include, but are not limited to, adding/removing a friend, starting/ending speaking, greeting, a conversation quality, and a conversation quantity (e.g., duration). The timing for which priority variations originating from actions are applied to priority values can vary. For example, all actions occurring over a given time interval (e.g., 10 minutes) can be considered and used to adjust priority. As another example, priority value variations can be applied each time a new user enters the virtual environment. However, priority value variations can be applied at any suitable timing.

Adding and/or removing a friend within the virtual environment can lead to a corresponding priority value variation. Adding a friend (e.g., a participant) by the user may lead to a positive priority value variation (e.g., +50), where removing a friend by the user may lead to a negative priority value variation (e.g., −50). Similar actions can also be considered and mapped to priority value variations, such as "mute," "ignore," "favorite," etc.

Various actions relating to speech and/or movement can also be considered as actions which lead to priority value variations of participants corresponding to CGOs. For example, each time a user starts speech and ends speech, a corresponding priority value variation may be applied. In this example, starting speech can lead to a positive priority value variation (e.g., +40), whereas stopping speech can lead to a negative priority value variation (e.g., −10). In embodiments, greetings can be used to affect priority value. For example, if a given participant "waves" at the user, a positive priority value variation can be applied (e.g., +10). Other greetings can also be considered, such as specific detected words (e.g., "Hello") and/or other postures/expressions completed by participants.

The quality and/or quantity of speech of participants within the virtual environment can also be used to affect priority values. For example, sentiment analysis can be performed to categorize one or more sentiments of speech between the user and other participants. Based on the output of the sentiment analysis (e.g., negative, positive, neutral), a corresponding priority value variation can be applied. For example, as shown in FIG. 4, a positive detected sentiment can lead to a positive priority value variation (e.g., +20), a neutral detected sentiment can lead to a positive priority value variation (e.g., +5), and a negative detected sentiment can lead to a negative priority value variation (e.g., −5). An example algorithm capable of analyzing tone and classifying sentiment is IBM Watson™ Tone Analyzer.

The quantity of speech (e.g., duration) can also be used to impact priority values. For example, for each second a participant talks to the user, a positive priority value variation can be applied (e.g., +1 per second). However, in embodiments, any suitable function can be applied to update priority variations over time for detected speech and/or general interactions. For example, duration of interaction (e.g., speech) between a user and a participant can affect priority according to priority variation=log(x), where "x" is the number of seconds of interaction. This can be applied to gradually decrease the impact on the priority score over time as the user interacts with other participants. For example, if a user and another participant interact for 10 minutes, this may not be 10 times more valuable than a 1 minute interaction with another participant (e.g., as compared to +1x shown in FIG. 4). However, functions can be applied to increase the impact on the priority score over time (e.g., $x^2$) as well.

Method 300 then proceeds to operation 310, where current CGO priorities are obtained. The current priority value of each CGO may be stored. In embodiments, a CGO priority list may already be generated indicating the priority value of each CGO within the CGO priority list.

CGO participant action and attribute histories occurring since a previous priority update are obtained. This is illustrated at operation 315. Thus, since the last CGO priority update, all attributes and actions of CGOs of corresponding participants may be recorded.

The CGO priority values of each participant can then be updated based on the action and attribute history since the previous priority update according to the mappings of priority change factors to priority value variations. This is illustrated at operation 320. As an example, assume a given participant has a CGO priority value of 50 since a previous update. If they have recorded priority change factors of: Action 1 (+50), Action 2 (+25), and Action 3 (+10), then the update priority value of the user would be 135 (e.g., Initial Value+Action 1+Action 2+Action 3=50+50+25+10=135). This can be completed for each CGO within the virtual environment based on a plurality of observed actions and attributes.

Thereafter, an ordered list of CGOs is then generated based on the updated CGO priority values. This is illustrated at operation 325. Thus, based on the updated priority value of each CGO, the CGO priority list is the ranked in descending order. For example, if three participants have priority values of Participant 1: 600, Participant 2: −50, and Participant 3: 100, then the CGO priority list can be ranked in descending order such that Participant 1 is first, Participant 3 is second, and Participant 2 is third.

The aforementioned operations can be completed in any order and are not limited to those described. Additionally, some, all, or none of the aforementioned operations can be completed, while still remaining within the spirit and scope of the present disclosure.

Figure 5:
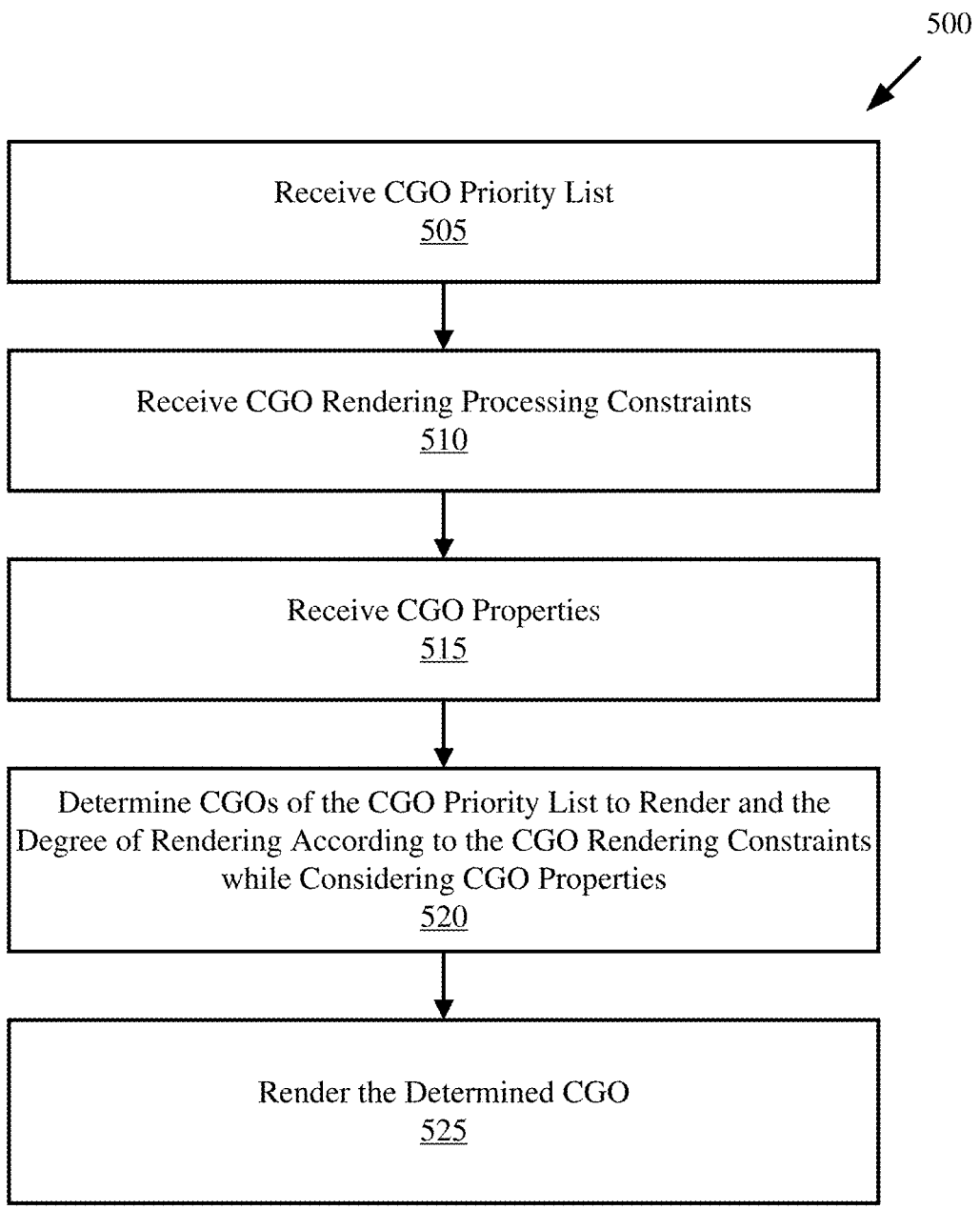
FIG. 5 is a flow-diagram depicting an example method for determining CGOs of a CGO priority list to render, in accordance with embodiments of the present disclosure.

Referring now to FIG. 5, shown is an example method 500 for rendering CGOs of a CGO priority list based on rendering processing constraints and CGO properties, in accordance with embodiments of the present disclosure.

Method 500 initiates at operation 505, where a CGO priority list is obtained. The CGO priority list can be a ranked CGO priority list including priority values of each participant within a multi-user virtual environment. The CGO priority list can be ranked/determined according to the methods of FIGS. 3-4.

CGO rendering processing constraints are then received. This is illustrated at operation 510. As discussed above, CGO rendering processing constraints refer to constraints on the number of CGOs to be rendered and/or the extent rendering of the CGOs which may be based on an available processing capacity of a device of a user (e.g., the user for which rendering is performed for). CGO rendering processing constraints can include one or more priority value thresholds which dictate whether CGOs should be rendered and the extent of rendering. For example, if a CGO priority threshold indicates that any CGOs corresponding to participants having a priority value below 100 are not rendered, then only CGOs corresponding to participants exceeding 100 would be rendered.

CGO properties are then received. This is illustrated at operation 515. CGO properties can include graphical properties of each CGO (e.g., a processing load of each CGO). For example, the amount of graphical data of each CGO (e.g., pixels or bits), the features of each CGO (e.g., lighting, shape, texture, etc.), effects of associated with each CGO (e.g., glowing, transparency, etc.), etc. Higher load CGOs may consume more processing resources, and thus may affect whether other CGOs can be rendered. Determining whether all CGOs can be rendered can be completed by comparing the processing resources required for all CGOs within the CGO priority list to a processing capacity (e.g., a bearable number of CGOs) of a device associated with a user.

CGOs of the CGO priority list to render and the degree of rendering are determined according to CGO rendering constraints while considering CGO object properties. This is illustrated at operation 520. As a detailed example, assume a list of CGOs within a multi-user virtual environment and a corresponding load of each respective CGO are shown in Table 1, presented below.

TABLE 1

Initial CGO List

| ID | 1 | 2 | 3 | 4 | 5 | 6 | 7 | 8 | 9 |
|---|---|---|---|---|---|---|---|---|---|
| Priority | Max | Min | 80 | 29 | 34 | 20 | 56 | 92 | 5 |
| Load | 20 | 15 | 30 | 5 | 14 | 10 | 21 | 8 | 12 |

In this example, assume the maximum processing capacity of a device of a user (the user is not included within Table 1) is 100. Each CGO corresponds to an ID. The priority row indicates the priority of each CGO. The load indicates the relative processing load of each CGO. Upon ranking the CGOs of Table 1 according to priority, a CGO priority list is obtained (e.g., at operation 505), shown in Table 2, presented below.

TABLE 2

CGO Priority List (Ranked in Descending Order of Priority)

| ID | 1 | 8 | 3 | 7 | 5 | 4 | 6 | 9 | 2 |
|---|---|---|---|---|---|---|---|---|---|
| Priority | Max | 92 | 80 | 56 | 34 | 29 | 20 | 5 | Min |
| Load | 20 | 8 | 30 | 21 | 14 | 5 | 10 | 12 | 15 |

In this example, assume that rendering processing constraints indicate that the highest priority CGOs are rendered up until the available processing capacity is met (e.g., 100). In this example, the following CGOs will be included on the rendering list, which includes a subset of the CGOs of the CGO priority list selected according to priority. The rendering list is shown in Table 3, presented below.

TABLE 3

| | Rendering List | | | | | |
|---|---|---|---|---|---|---|
| ID | 1 | 8 | 3 | 7 | 5 | 4 |
| Priority | Max | 92 | 80 | 56 | 34 | 29 |
| Load | 20 | 8 | 30 | 21 | 14 | 5 |

Accordingly, in this example, as shown in Table 3, only CGOs with IDs 1, 8, 3, 7, 5, and 4 will be rendered, as rendering these CGOs falls within the available processing capacity (e.g., 98<100). Any additional lower priority CGOs exceed the available capacity, and thus may not be rendered.

The determined CGOs are then rendered. This is illustrated at operation 525. Rendering can be completed in the same, or a substantially similar manner, as described with respect to FIG. 1.

The aforementioned operations can be completed in any order and are not limited to those described. Additionally, some, all, or none of the aforementioned operations can be completed, while still remaining within the spirit and scope of the present disclosure.

Figure 6:
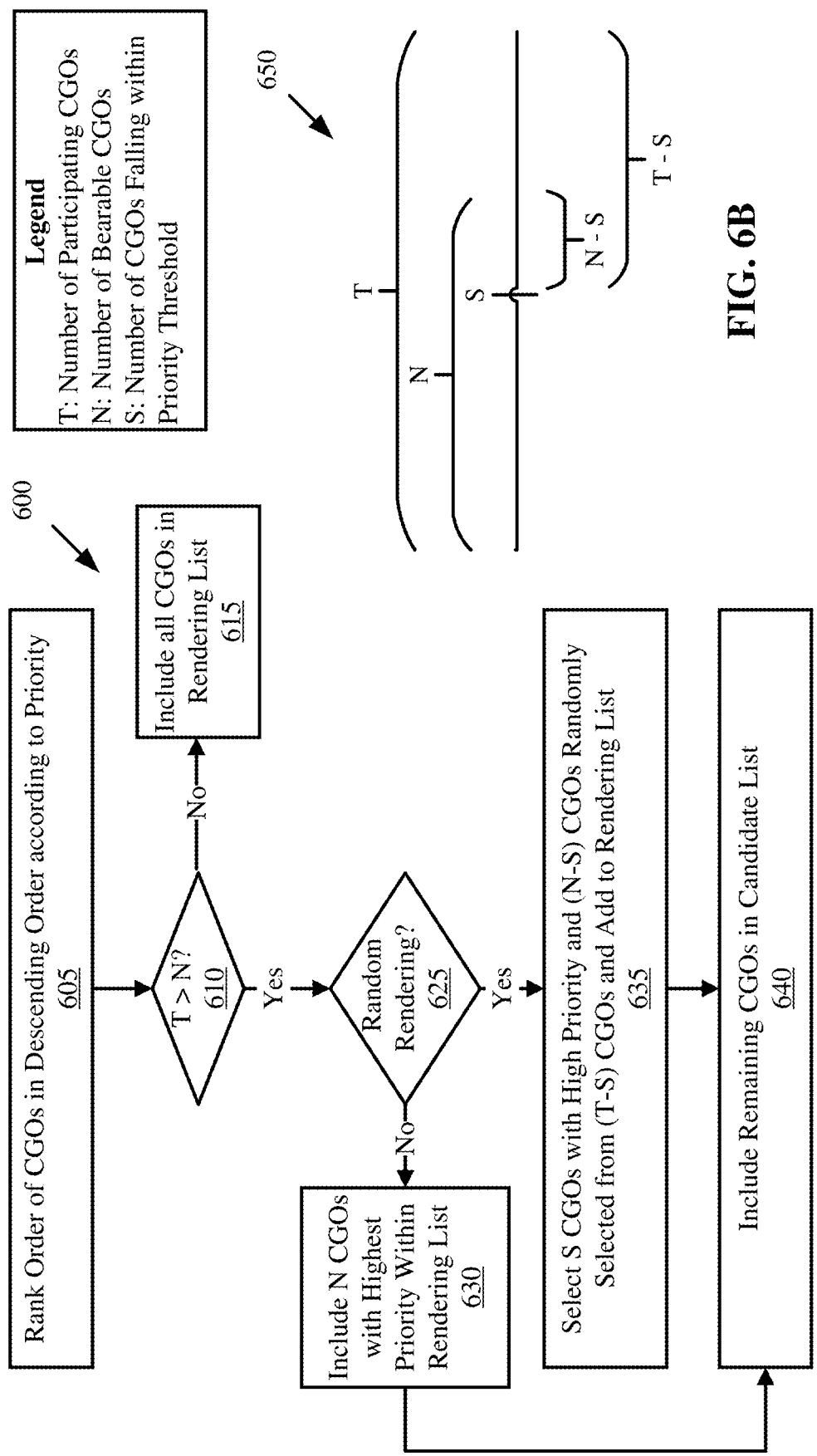
FIG. 6A is a flow-diagram depicting an example method for determining CGOs to include in a rendering list, in accordance with embodiments of the present disclosure.
FIG. 6B is a diagram depicting a number of participating CGOs, a number of bearable CGOs, and a threshold number of CGOs falling within a priority threshold, in accordance with embodiments of the present disclosure.

Referring now to FIGS. 6A and 6B, shown is an example method 600 for rendering CGOs based on a threshold priority value and a processing capacity of a device of a user shown in diagram 650, in accordance with embodiments of the present disclosure.

Referring first to diagram 650 of FIG. 6B, "T" depicts the total number of participating CGOs (e.g., users) in a multi-user virtual environment, "N" depicts a total number of bearable CGOs to be rendered by a processing device of a user, and "S" depicts a threshold defining the number of high priority CGOs to be rendered.

Referring now to FIG. 6A, method 600 initiates at operation 605, where an order of CGOs is ranked in descending order according to priority values. For example, the CGO priority list can be the same as, or substantially similar to, Table 2 described with reference to FIG. 5.

A determination is made whether the total number of participating CGOs is greater than the number of bearable CGOs of a processing device configured to perform rendering. This is illustrated at operation 610.

If a determination is made that the total number of participating CGOs is not greater than the number of bearable CGOs, then all CGOs are added to the rendering list. This is illustrated at operation 615. An example rendering list is shown and described within Table 3 of FIG. 5.

If a determination is made that the total number of participating CGOs is greater than the number of bearable CGOs, then a determination is made whether random rendering will be completed. This is illustrated at operation 625.

If a determination is made that random rendering will not be completed, then N CGOs with the highest priority are included within the rendering list. This is illustrated at operation 630. Thus, all of the highest ranked CGOs are included up until the bearable number of CGOs are met.

If a determination is made that random rendering will be completed, then S CGOs with high priority are selected and (N-S) CGOs are randomly selected from (T-S) CGOs and are added to the rendering list. This is illustrated at operation 635. Random rendering can be completed such that lower priority CGOs are variably selected for rendering. This can be completed to allow the user to interact with a more diverse set of participants within the multi-user virtual environment. In this embodiment, only lower priority CGO's are randomly selected for rendering, which helps ensure high priority CGO's are always rendered.

Upon including either N CGOs with the highest priority on the rendering list at operation 630, or upon including S CGOs with the highest priority and (N-S) CGOs randomly selected from (T-S) CGOs on the rendering list at operation 635, the remaining CGOs are added to a candidate list. This is illustrated at operation 640. The candidate list can include a list of CGOs which were not selected, but may be selected at some point in the future. Thus, they are candidates for rendering in the future.

The aforementioned operations can be completed in any order and are not limited to those described. Additionally, some, all, or none of the aforementioned operations can be completed, while still remaining within the spirit and scope of the present disclosure.

Figure 7:
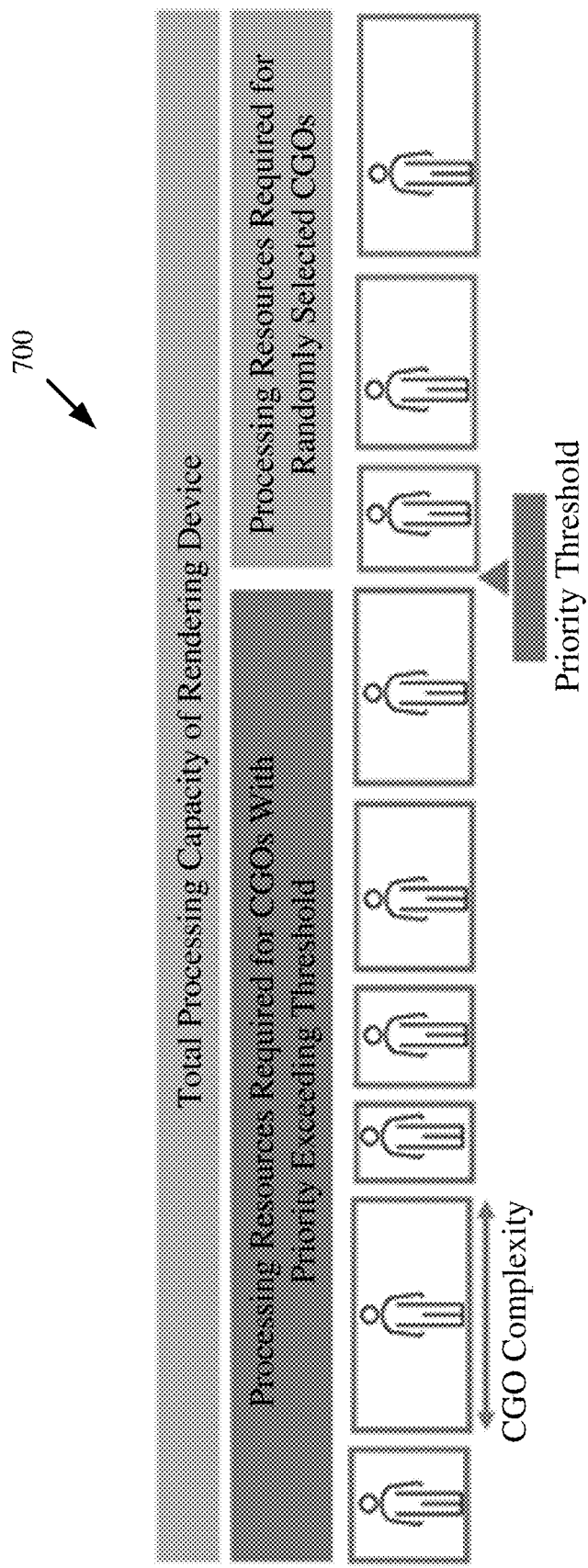
FIG. 7 is a diagram depicting processing resources required for CGOs as compared to a total processing capacity of a rendering device, in accordance with embodiments of the present disclosure.

Referring now to FIG. 7, shown is a diagram 700 depicting CGOs to be rendered, in accordance with embodiments of the present disclosure. As depicted in FIG. 7, a total processing capacity of a rendering device is depicted on the top. Below the total processing capacity of the rendering device, the left side includes processing resources required for CGOs with a priority value exceeding a set priority threshold. The right side includes processing resources required for CGOs that are randomly selected. The width of each CGO (depicted as human figures) depicts the CGO complexity. Thus, six CGOs are selected and added to a rendering list based on a priority value of each of the six CGOs exceeding a priority threshold and three CGOs are added to a rendering list which do not exceed the priority threshold and which were randomly selected (e.g., according to the method described in FIG. 6).

Figure 8:
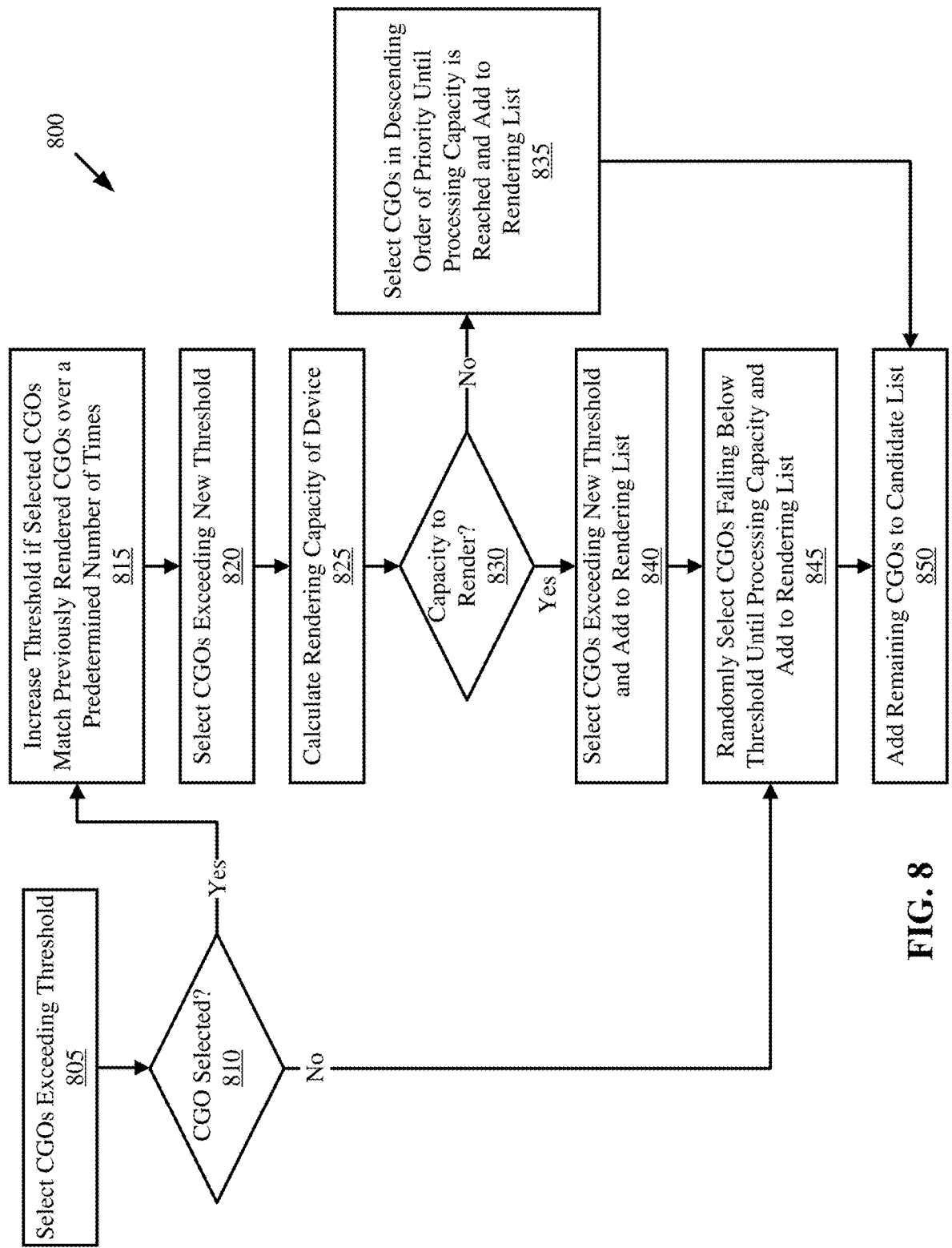
FIG. 8 is a flow-diagram depicting a method for determining CGOs to include in a rendering list, in accordance with embodiments of the present disclosure.

Referring now to FIG. 8, shown is an example method 800 for selecting CGOs to be added to a rendering list, in accordance with embodiments of the present disclosure.

Method 800 initiates at operation 805, where CGOs having a priority value exceeding a threshold priority are selected. In some embodiments, no CGOs may be selected at operation 805 (if no CGOs have priority values exceeding the priority value threshold).

A determination is then made whether any CGOs were selected at operation 805. This is illustrated at operation 810. If a determination is made that there was at least one selected CGO which exceeded the priority threshold, then the priority threshold is increased if the selected CGO(s) match previously rendered CGOs over a predetermined number of times. This is illustrated at operation 815. This can be completed such that CGOs exceeding the priority threshold value which are frequently rendered may no longer exceed the priority threshold and thus must be randomly selected. This may increase the diversity of CGOs to be displayed to a user (e.g., such that the same CGOs are not rendered every time). However, in embodiments, operation 815 may not be completed and the same threshold may be maintained (e.g., operations 815-820 can be skipped).

The CGOs exceeding the new threshold are then selected. This is illustrated at operation 820. A rendering capacity of a device of a user configured to render the CGOs is then determined. This is illustrated at operation 825. The rendering capacity can be based on the specifications of a CPU or GPU responsible for rendering (e.g., video random access memory (VRAM) capacity, clock speed, cores, memory architecture (e.g., turing), memory type (e.g., DDR6), bandwidth, etc.) and/or user specified tolerance for frame-rate and/or resolution.

A determination is made whether there is capacity to render all selected CGO which exceed the new threshold.

This is illustrated at operation 830. If a determination is made that there is not capacity to render all CGOs which exceed the new priority threshold, then CGOs are selected in descending order of priority until the processing capacity is met, and the selected CGOs are added to the rendering list. This is illustrated at operation 835.

If a determination is made that there is enough capacity to render all CGOs which exceed the new priority threshold, then the CGOs exceeding the new threshold are selected and added to the rendering list. This is illustrated at operation 840.

Upon adding selected CGOs exceeding the new threshold to the rendering list at operation 840, or upon determining that no CGOs are selected at operation 810 (as no CGOs exceed the threshold), CGOs which fall below the priority threshold are then randomly selected until the processing capacity of the device of the user is met, and the selected CGOs are added to the rendering list. This is illustrated at operation 845. Randomly selecting CGOs which do not exceed the threshold can be completed in any suitable manner (e.g., using a random number generator).

Thereafter, upon adding randomly selecting CGOs falling below the threshold until the processing capacity of the device of the user is met to the rendering list at operation 845, or upon adding CGOs selected in descending order of priority until the processing capacity of the device of the user to the rendering list at operation 835, the remaining CGOs are added to the candidate list. This is illustrated at operation 850.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
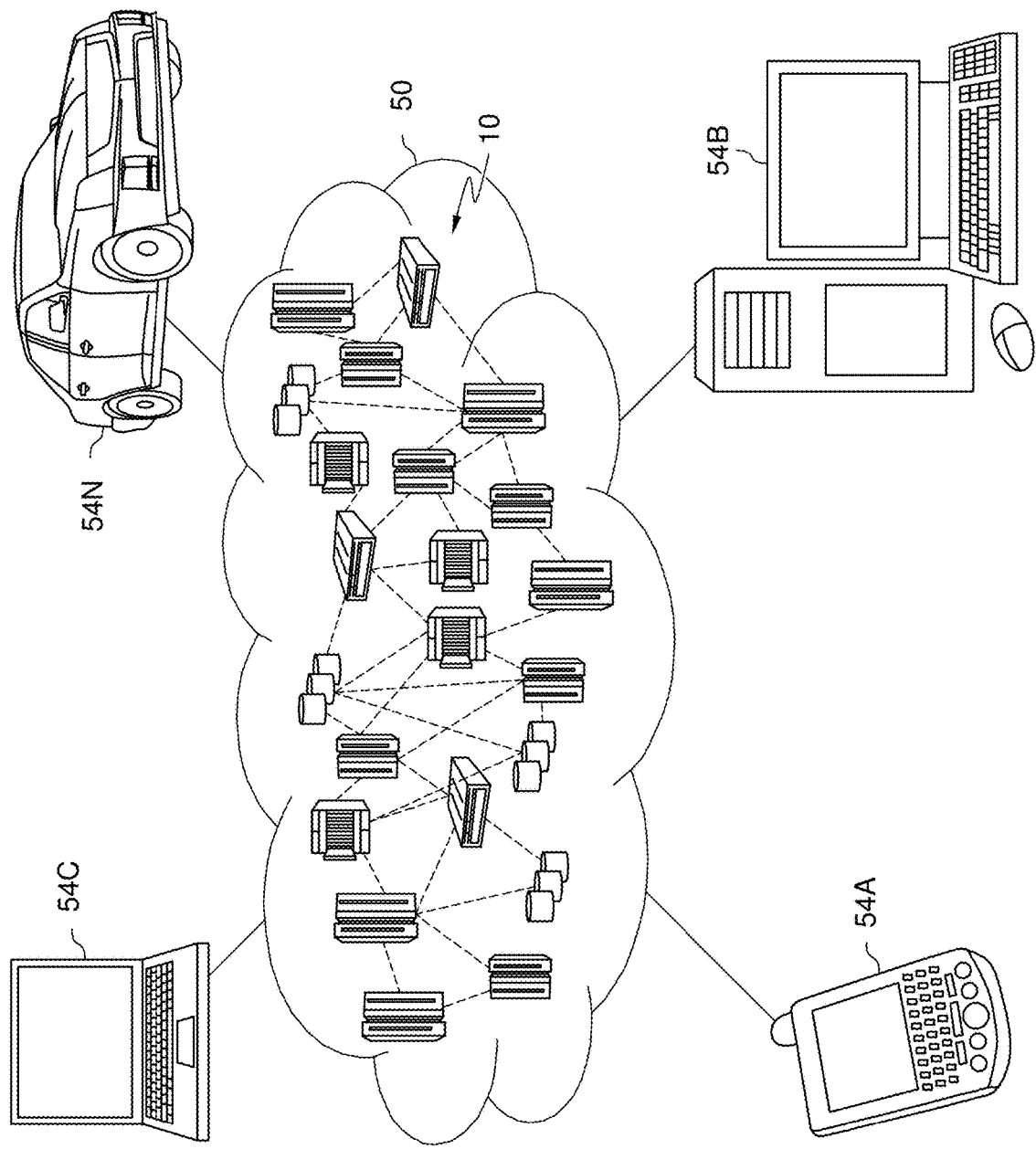
FIG. 9 is a diagram illustrating a cloud computing environment, in accordance with embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
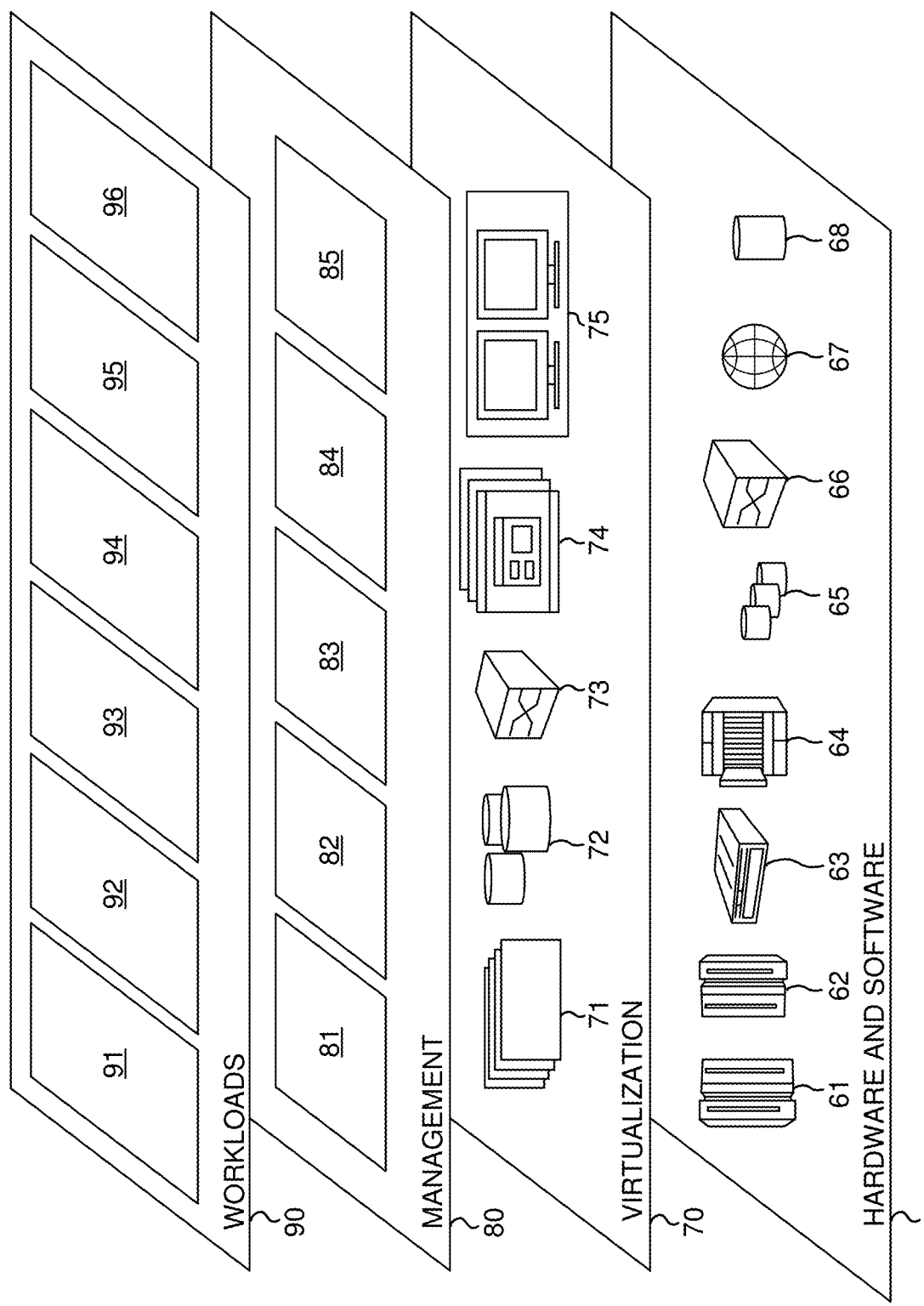
FIG. 10 is a block diagram illustrating abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CGO rendering management 96.

Figure 11:
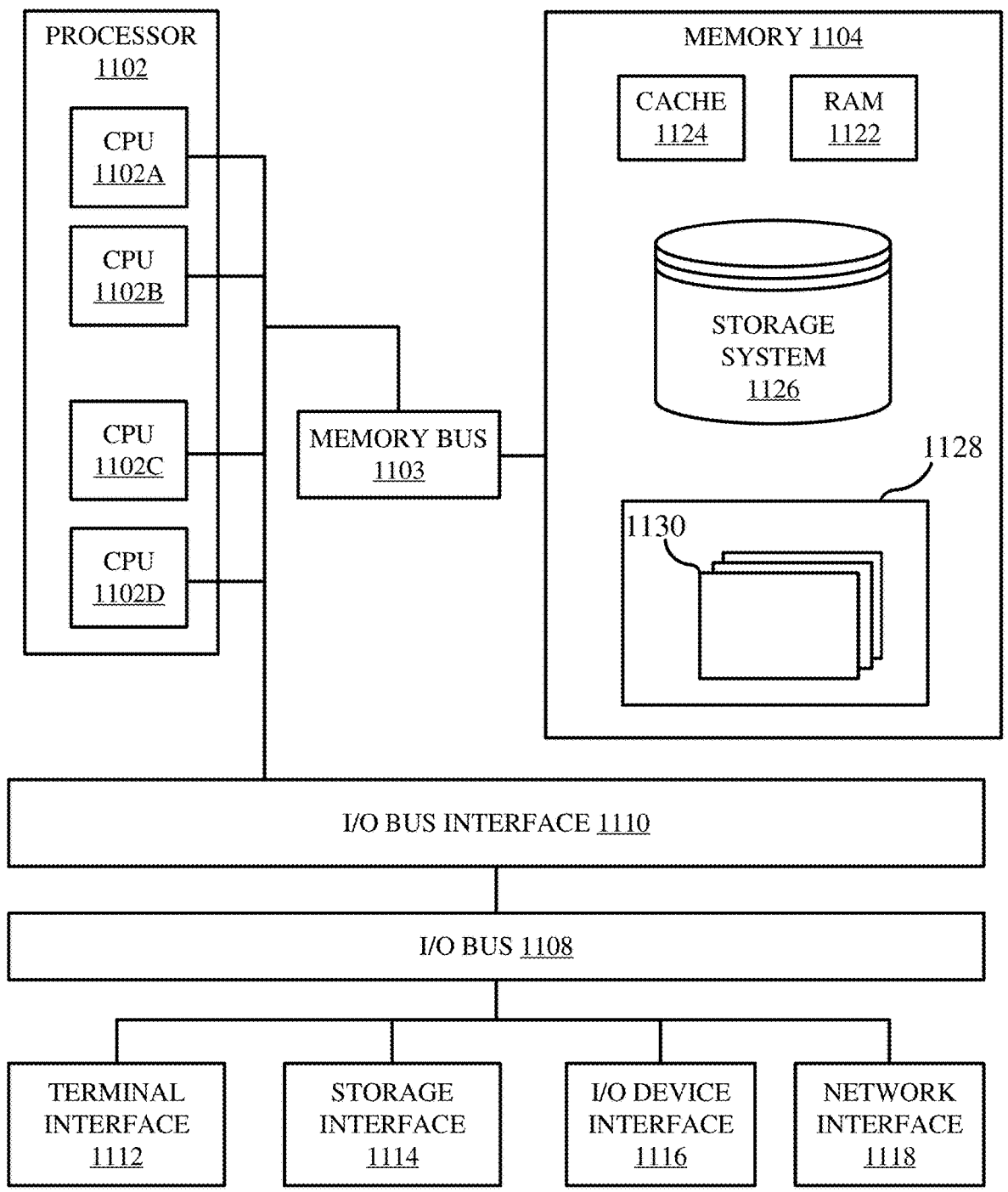
FIG. 11 is a high-level block diagram illustrating an example computer system that can be used in implementing one or more of the methods, tools, and modules, and any related functions described herein, in accordance with embodiments of the present disclosure.

Referring now to FIG. 11, shown is a high-level block diagram of an example computer system 1101 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1114, an I/O (Input/Output) device interface 1116, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method for determining computer graphics object (CGO) avatars to render for a device of a user in a virtual environment having a plurality of participants, each participant corresponding to a CGO avatar, the method comprising:
   determining a priority value of each CGO avatar corresponding to each participant;
   generating, based on the determined priority values, a CGO avatar priority list, wherein the CGO avatar priority list ranks the CGO avatars based on the priority values;
   generating a rendering list of CGO avatars, wherein the rendering list includes a subset of the CGO avatars of the CGO avatar priority list based on applied rendering processing constraints, wherein the applied rendering processing constraints are based on an available processing capacity of a processing unit of the device;
   rendering the CGO avatars of the rendering list by the processing unit of the device;
   updating the priority of each CGO avatar corresponding to each participant based on a set of priority change factors associated with each CGO avatar mapped to priority value variations, wherein the priority change factors include at least attributes of each CGO avatar and actions taken by each CGO avatar between a first time that the CGO avatar priority list was generated and a second time the updated CGO avatar priority list was updated; and
   generating an updated CGO avatar priority list based on the updated priorities of each CGO avatar.

2. The method of claim 1, wherein attributes of each CGO avatar include a user role, wherein actions taken by each CGO avatar include a duration of interaction, wherein a first user role has a first priority value variation greater than a second user role having a second priority value variation, wherein a greater duration of interaction has a greater priority value variation than a lesser duration of interaction.

3. The method of claim 1, wherein generating the rendering list of CGO avatars includes:
defining a threshold priority value;
selecting all CGO avatars of the CGO avatar priority list having a priority value exceeding the threshold priority value; and
randomly selecting at least one CGO avatar having a priority value falling below the threshold priority value.

4. The method of claim 3, wherein CGO avatars having the priority value falling below the threshold priority value are randomly selected until the processing capacity of the processing unit of the device of the user is met.

5. The method of claim 1, wherein upon generating the CGO avatar priority list, a determination is made whether all CGO avatars of the CGO avatar priority list can be rendered based on the available processing capacity of the processing unit of the device, wherein in response to determining that all CGO avatars of the CGO avatar priority list cannot be rendered, generating the rendering list of CGO avatars including the subset of CGO avatars.

6. The method of claim 5, wherein prior to generating the rendering list, a determination is made whether random rendering is enabled, wherein in response to determining that random rendering is enabled, generating the rendering list comprises:
defining a threshold priority value;
selecting all CGO avatars of the CGO avatar priority list having a priority value exceeding the threshold priority value; and
randomly selecting CGO avatars having a priority value falling below the threshold priority value until the available processing capacity of the processing unit of the device is reached.

7. A system comprising:
one or more processors; and
one or more computer-readable storage media collectively storing program instructions which, when executed by the one or more processors, are configured to cause the one or more processors to perform a method for determining computer graphics object (CGO) avatars to render for a device of a user in a virtual environment having a plurality of participants, each participant corresponding to a CGO avatar, the method comprising:
determining a priority value of each CGO avatar corresponding to each participant;
generating, based on the determined priority values, a CGO avatar priority list, wherein the CGO avatar priority list ranks the CGO avatars based on the priority values;
generating a rendering list of CGO avatars, wherein the rendering list includes a subset of the CGO avatars of the CGO avatar priority list based on applied rendering processing constraints, wherein the applied rendering processing constraints are based on an available processing capacity of a processing unit of the device, wherein generating the rendering list of CGO avatars includes:
defining a threshold priority value;
selecting all CGO avatars of the CGO avatar priority list having a priority value exceeding the threshold priority value; and
randomly selecting at least one CGO avatar having a priority value falling below the threshold priority value; and
rendering the CGO avatars of the rendering list by the processing unit of the device.

8. The system of claim 7, wherein the method performed by the one or more processors further comprises:
updating the priority of each CGO avatar corresponding to each participant based on a set of priority change factors associated with each CGO avatar mapped to priority value variations; and
generating an updated CGO avatar priority list based on the updated priorities of each CGO avatar.

9. The system of claim 8, wherein the priority change factors include at least attributes of each CGO avatar and actions taken by each CGO avatar between a first time that the CGO avatar priority list was generated and a second time the updated CGO avatar priority list was updated.

10. The system of claim 9, wherein attributes of each CGO avatar include a user role, wherein actions taken by each CGO avatar include a duration of detected interaction, wherein a first user role has a first priority value variation greater than a second user role having a second priority value variation, wherein a greater duration of interaction has a greater priority value variation than a lesser duration of interaction.

11. The system of claim 7, wherein CGO avatars having the priority value falling below the threshold priority value are randomly selected until the processing capacity of the processing unit of the device of the user is met.

12. A computer program product comprising one or more computer readable storage media, and program instructions collectively stored on the one or more computer readable storage media, the program instructions comprising instructions configured to cause one or more processors to perform a method for determining computer graphics object (CGO) avatars to render for a device of a user in a virtual environment having a plurality of participants, each participant corresponding to a CGO avatar, the method comprising:
determining a priority value of each CGO avatar corresponding to each participant;
generating, based on the determined priority values, a CGO avatar priority list, wherein the CGO avatar priority list ranks the CGO avatars based on the priority values;
generating a rendering list of CGO avatars, wherein the rendering list includes a subset of the CGO avatars of the CGO avatar priority list based on applied rendering processing constraints, wherein the applied rendering processing constraints are based on an available processing capacity of a processing unit of the device;
rendering the CGO avatars of the rendering list by the processing unit of the device;
updating the priority of each CGO avatar corresponding to each participant based on a set of priority change factors associated with each CGO avatar mapped to priority value variations, wherein the priority change factors include at least attributes of each CGO avatar and actions taken by each CGO avatar between a first time that the CGO avatar priority list was generated and a second time the updated CGO avatar priority list was updated; and
generating an updated CGO avatar priority list based on the updated priorities of each CGO avatar.

13. The computer program product of claim 12, wherein attributes of each CGO avatar include a user role, wherein actions taken by each CGO avatar include a duration of detected interaction, wherein a first user role has a first priority value variation greater than a second user role having a second priority value variation, wherein a greater duration of interaction has a greater priority value variation than a lesser duration of interaction.

14. The computer program product of claim 12, wherein generating the rendering list of CGO avatars includes:
- defining a threshold priority value;
- selecting all CGO avatars of the CGO avatar priority list having a priority value exceeding the threshold priority value; and
- randomly selecting at least one CGO avatar having a priority value falling below the threshold priority value.

15. The computer program product of claim 14, wherein CGO avatars having the priority value falling below the threshold priority value are randomly selected until the processing capacity of the processing unit of the device of the user is met.

\* \* \* \* \*